(12) United States Patent
Izu et al.

(10) Patent No.: US 8,391,477 B2
(45) Date of Patent: Mar. 5, 2013

(54) CRYPTOGRAPHIC DEVICE HAVING TAMPER RESISTANCE TO POWER ANALYSIS ATTACK

(75) Inventors: Tetsuya Izu, Kawasaki (JP); Kouichi Itoh, Kawasaki (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1260 days.

(21) Appl. No.: 11/782,168

(22) Filed: Jul. 24, 2007

(65) Prior Publication Data

US 2008/0025500 A1    Jan. 31, 2008

Related U.S. Application Data

(63) Continuation of application No. PCT/JP2005/000878, filed on Jan. 24, 2005.

(51) Int. Cl.
*H04K 1/00* (2006.01)
*H04L 9/00* (2006.01)
*G06F 7/58* (2006.01)
*G06F 11/30* (2006.01)
*G06F 12/14* (2006.01)

(52) U.S. Cl. ............ 380/30; 708/250; 713/194
(58) Field of Classification Search ........ 380/30
See application file for complete search history.

(56) References Cited

U.S. PATENT DOCUMENTS 6,873,706 B1 * 3/2005 Miyazaki et al. ............ 380/30
7,308,096 B2 * 12/2007 Okeya et al. ................. 380/28
7,379,546 B2 * 5/2008 Ibrahim ........................ 380/28

FOREIGN PATENT DOCUMENTS

JP    2003-177670    6/2003

OTHER PUBLICATIONS

Efficient Countermeasures against RPA, DPA and SPA, CHES 2004, Lecture Notes in Computer Science vol. 3156, pp. 343-356, Springer-Verlag, 2004, written by H. Mamiya, A. Miyaji, H. Morimoto.*
Izu, et al., "A Fast Parallel Elliptic Curve Multiplication Resistant against Side Channel Attacks", Jan. 29, 2004, SCIS 2002, IEICE, vol. I of II, p. 209-514.
International Search Report, Mar. 2005.
Itoh, et al., "A Randomized Initial Point Countermeasure against Power Analysis", Jan. 27, 2004, SCIS 2004m, IEICE, vol. I of II, p. 653-658.
Morimoto, et al. "Elliptic Curve Cryptosystems secure against ZPA", Mar. 8, 2004, Technical Report of IEICE, ISEC 2003-103, vol. 103, No. 712, p. 43-48.
Japanese Office Action issued Jul. 13, 2010 in corresponding Japanese Patent Application 2006-553807.

* cited by examiner

*Primary Examiner* — Nathan Flynn
*Assistant Examiner* — Trang Doan
(74) *Attorney, Agent, or Firm* — Staas & Halsey LLP (57) ABSTRACT

A randomly selected point on an elliptic curve is set as the initial value of a variable and calculation including a random point value is performed in an algorithm for calculating arbitrary scalar multiple operation on an elliptic curve when scalar multiplication and addition on an elliptic curve are defined, then a calculation value obtained as a result of including a random point is subtracted from the calculation result, whereby an intended scalar multiple operation value on an elliptic curve is determined.

9 Claims, 5 Drawing Sheets

F I G. 1

F I G. 2

F I G. 3

F I G. 4

F I G. 5

CRYPTOGRAPHIC DEVICE HAVING TAMPER RESISTANCE TO POWER ANALYSIS ATTACK

CROSS REFERENCE TO RELATED APPLICATION

This application is a continuation of PCT application of PCT/JP2005/000878, which was filed on Jan. 24, 2005.

BACKGROUND OF THE INVENTION

1. Field of the Invention

The present invention relates to a cryptographic device, and particularly to a cryptographic device having tamper resistance for preventing power analysis attacks on processors executing the RSA cryptosystem and the elliptic-curve cryptosystem.

2. Description of the Related Arts

Services using networks, such as electronic money, electronic tickets, services provided by e-government, have been widely employed. In these services, smart cards (IC cards) each including an IC chip storing secret information on a user are sometimes used in order to certify that the user is a legitimate user. Smart cards have functions that perform encryption, digital signatures, verification, and the like, and use users' secret information as keys. Smart cards present much better protection and tamper resistance against unauthorized accesses by third parties than magnetic cards because, in smart cards, the secret information is stored in the IC chips or memory units.

Examples of the cryptosystem employed in cryptographic devices such as smart cards include public key cryptosystem and common key cryptosystem. In public key cryptosystem, different keys are used for encryption and decryption. Typically, the key used for encryption (public key) is in a public state, and a person who wants to transmit his or her information encrypts the plaintext by using this public key before the transmission. The key used for decrypting the encrypted text (secret key) is held as secret information that is known only to the receiving person, and the receiving person can obtain the plaintext by decrypting the encrypted text with the secret key. Examples of public key cryptosystem include RSA cryptosystem and elliptic-curve cryptosystem.

One of the functions for performing the main operations that are required for executing the RSA cryptosystem is the modular exponentiation operation function. The exponentiation operation is an operation in the form of $$a \hat{} d (\bmod n) = a \times a \times \ldots \times a \, (d \text{ times}) (\bmod n)$$

where "^" represents the exponentiation, and a, d, and n represent integers. Also, "mod n" represents the remainder left after division by n. The functions of the RSA cryptosystem include encryption, decryption, signature generation, and signature verification. In decryption and signature generation, values related to the secret information of users are used for "d".

Examples of functions for performing the main operations required for executing the processes of elliptic-curve cryptosystem include scalar multiplication. The scalar multiplication used herein is an operation in the form of $$d \times P = P + P + \ldots + P \, (d \text{ times})$$

where d represents an integer and P represents a point on an elliptic curve. The functions based on elliptic-curve cryptosystem include encryption, decryption, signature generation, signature verification, and key sharing. In decryption, signature generation, and key sharing, values related to the secret information of users are used for "d". The above modular exponentiation operation for the RSA cryptosystem and scalar multiplication for the elliptic-curve cryptosystem are examples for operations called the exponentiation operation.

Examples of techniques employed in the field of handling secret information include a technique called cryptanalysis (tampering technique). Cryptanalysis is a technique used for detecting what is included in secret information (such as a secret key) on the basis of available information (such as an encrypted text), the various methods of which are known. Among these methods, there is a method called side channel attack that has recently gained interest.

The side channel attack method is a cryptanalysis method that was introduced by P. Kocher in 1996 (see "Timing attacks on implementation of Diffie-Hellman, RSA, USA and other systems", CRYPTO'96, Lecture Notes in Computer Science Vol. 1109, pp. 104-113, Springer-Verlag, 1996 (document [Koc96]). In this method, side channel information (electrical power consumption data, time consumption data, electromagnetic wave data and the like) obtained when various data are input into the cryptographic processor mounted on a smart card or the like is collected and analyzed in order to detect the key information in the cryptographic processor. It has been pointed out that, by using the side channel attack, the secret keys in cryptographic processors can be detected both in public key cryptosystem and common key cryptosystem.

An example of a method of side channel attack is a powerful method called power analysis attack, in which electric power consumption data is used. Examples of power analysis attacks include differential power analysis (DPA), reported by P. Kocher, J. Jaffe and B. Jun in Crypto'99, Lecture Notes in Computer Science Vol. 1666, pp. 388-397, Springer-Verlag, 1999 (document [KJJ99]), and simple power analysis (SPA). SPA is a method in which secret keys are detected on the basis of characteristics in electric power consumption data in cryptographic processors, and DPA is a method in which secret keys are detected by analyzing the differences between a large number of pieces of electric power consumption data. Other examples of power analysis attacks include the refined power analysis (RPA) reported by L. Goubin in "Refined Power-analysis Attacks on Elliptic Curve Cryptosystems", PKC 2003, Lecture Notes in Computer Science Vol. 2567, pp. 199-210, Springer-Verlag, 2003 (document [Gou03]), and zero-value power analysis (ZVA) reported by T. Akishita and T. Takagi in "Zero-value Point Attacks on Elliptic Curve Cryptosystems", ISC 2003, Lecture Notes in Computer Science Vol. 2851, pp. 218-233, Springer-Verlag, 2003 (document [AT03]).

The need for techniques that prevent such power analysis attacks as described above has been suggested in the field of international standardization. For example, in the protection profile (PP) for smart cards that is based on (ISO) (International Standards Organization) 15408 in the field of security, countermeasures against power analysis attacks are required. Also, in FIPS140-2, which is one of the standards for cryptographic modules employed in the USA, it is thought that countermeasures against power analysis attacks will be required in the future, although this need is only being discussed at present.

In RSA cryptosystem and elliptic-curve cryptosystems, the main operation in the cryptographic process is the exponentiation operation. Also, this exponentiation operation is the target of power analysis attacks. Hereinafter, a method of realizing the scalar multiplication d×P in elliptic-curve cryptosystem is described.

The binary method is an operation for computing the scalar multiplication. Some of the binary methods are a method in which computations are performed from the least significant bit (binary method (LSB)), a method in which computations are performed from the most significant bit (binary method (MSB), and a method that is a variation of the binary method (MSB) using the Montgomery chain (Montgomery method).

An example of an algorithm for the binary method (LSB) is given as (1) Algorithm 1, an example of an algorithm for the binary method (MSB) is given as (2) Algorithm 2, and an example of an algorithm for the Montgomery method is given as (3) Algorithm 3. In these algorithms, unless otherwise noted, lowercase letters (such as "d") represent scalar values and capital letters (such as "P") represent points on elliptic curves. Also, "^" represents exponentiation, and a series of numbers expressed between "(" and ")$_2$" represents a number expressed as a binary number. Also, numbers preceded by an "S" (e.g., "S1:") are step numbers in an exemplary program. Hereinafter, the four arithmetical operations on an elliptic curve are respectively included between "⌈" and "⌋".

---

(1) Algorithm 1 [Binary method (LSB)]

```
S1: T[0] ← 0, T[1] ← P
S2: for i = 0 upto n−1 {
S3:     if (d[i] == 1) {
S4:         T[0] ← ⌈T[0] + T[1]⌋ ← *
S5:     }
S6:     T[1] ← ⌈2*T[1]⌋
S7: }
S8:     return T[0],
```

--- where T[0], T[1], and T[2] represent temporary variables, d represents a scalar value in n bits, and d[i] represents a value of the lower i-th bit of d.

As an example, a case is described here in which the scalar multiplication ⌈d×P⌋ for d=21=2^4+2^2+2^0=(10101)$_2$ (d is an integer in 5 bits) is performed. In step S1, the variable T[0] is set to the point 0, and the variable T[1] is set to the point P. In steps S2 through S7 that follow, respective processes corresponding to i=0, 1, 2, 3, 4 are executed.

When i=0, d[i]=d[0]=1, and accordingly the variable T[0] is set to ⌈T[0]+T[1]⌋ and the value of the variable T[0] after processing is P. In step S6, the variable T[1] is set to ⌈2*T[1]⌋ and the variable T[1] after processing is ⌈2×P⌋.

When i=1, d[i]=d[1]=0, and accordingly steps S3 through S5 are skipped. In step S6, the variable T[1] is set to ⌈2*T[1]⌋, and the value of the variable T[1] after processing is ⌈4×P⌋.

When i=2, d[i]=d[2]=1, and accordingly in step S4 the variable T[0] is set to ⌈T[0]+T[1]⌋, and the value of the variable T[0 after processing is ⌈5×P⌋. In step S6, the variable T1 is set to ⌈2*T[1]⌋, and the value of the variable T[1] after processing is ⌈8×P⌋.

When i=3, d[i]=d[3]=0, and accordingly steps S3 through S5 are skipped. In step S6, the variable T[1] is set to ⌈2*T[1]⌋, and the value of the variable T[1] after processing is ⌈16×P⌋.

When i=4, d[i]=d[0]=1, and accordingly in step S4 the variable T[0] is set to ⌈T[0]+t[1]⌋ and the value of the variable T[0] after processing is ⌈21×P⌋. In step S6, the variable T[1] is set to ⌈2*T[1]⌋, and the value of the variable T[1] after processing is ⌈32×P⌋.

After the above processes, the processes in steps S2 through S7 are terminated, and the value of the variable T[0] i.e., ⌈21×P⌋, is output in the last step S8.

---

(2) Algorithm 2 [binary method (MSB)]

```
S1: T[0] ← P
S2: for i = n−2 downto 0 {
S3:     T[0] ← ⌈2*T[0]⌋
S4:     if (d[i] == 1) {
S5:         T[0] ← ⌈T[0] + P⌋ ← *
S6:     }
S7: }
S8: return
T[0]
```

--- where T[0] represents a temporary variable, d represents a scalar value in n bits, and d[i] represents a value of the lower i-th bit of d.

As an example, a case is described in which the scalar multiplication ⌈d×P⌋ for d=21=2^4+2^2+2^0=(10101)$_2$ (d is an integer in 5 bits) is performed. In step S1, the variable T[0] is set to the point P. In steps S2 through S7 that follow, respective processes corresponding to i=3, 2, 1, 0 are executed.

When i=3, in step S3, the variable T[0] is set to ⌈2*T[0]⌋, and the value of the variable T[0] after processing is ⌈2×P⌋. Also, when i=3, d [i]=d[3]=0, and accordingly steps S4 through S6 are skipped.

When i=2, in step S3, the variable T[0] is set to ⌈2*T[0]⌋, and the value of the variable T[0] after processing is ⌈4×P⌋. Also, when i=2, d[i]=d[2]=1, and accordingly in step s5 the variable T[0] is set to ⌈T[0]+P⌋, and the value of the variable T[0] after processing is ⌈5×P⌋.

When i=1, in step S3, the variable T[0] is set to ⌈2*T[0]⌋, and the value of the variable T[0] after processing is ⌈10×P⌋. Also, when i=1, d [i]=d[1]=0, and accordingly steps S4 through s6 are skipped.

When i=0, in step S3, the variable T[0] is set to ⌈2*T[0]⌋, and the value of the variable T[0] after processing is ⌈20×P⌋. Also, when i=0, d[i]=d[0]=1, and accordingly variable T[0] is set to ⌈T[0]+P⌋ in step s5, and the value of the variable T[0] after processing is ⌈21×P⌋.

After the above processes, the processes in steps S2 through S7 are terminated, and the value of the variable T[0], i.e., ⌈21×P⌋ is output in the last step, S8.

---

(3) Algorithm 3 [Montgomery method]

```
S1: T[0] ← P, T[1] ← ⌈2*P⌋
S2: for i = n−2 downto 0 {
S3:     T[2] ← ⌈2*T[d[i]]⌋
S4:     T[1] ← ⌈T[0] + T[1]⌋
S5:     T[0] ← T[2-d[i]]
S6:     T[1] ← T[1+d[i]]
S7: }
S8: return T[0],
```

--- where T[0], T[1], and T[2] represent temporary variables, d represents a scalar value in n bits, and d[i] represents a value of the lower i-th bit of d.

As an example, the case is described here in which the scalar multiplication ⌈d×P⌋ for d=21=2^4+2^2+2^0=(10101)$_2$ (d is an integer in 5 bits) is performed. In step S1, the variable T[0] is set to the point P, and the variable T[1] is set to ⌈2×P⌋. In the following steps S2 through S7, respective processes corresponding to i=3, 2, 1, 0 are executed.

When i=3, d[i]=d[3]=0. In step S3, the variable T[2] is set to ⌈2*T[0]⌋, and the value of the variable T[2] after processing is ⌈2×P⌋. In step S4, the variable T[1] is set to ⌈T[0]+T[1]⌋, and the value of the variable T[1] after processing is $\lceil 3 \times P \rceil$. In step S5, the variable T[0] is set to T[2], and the value of the variable T[0] after processing is $\lceil 2 \times P \rceil$. In step S6, the variable T[1] is set to T[1], and the value of the variable T[1] is $\lceil 3 \times P \rceil$.

When i=2, d[i]=d[2]=1. In step S3, the variable t[2] is set to $\lceil 2*T[1] \rfloor$, and the value of the variable T[2] after processing is $\lceil 4 \times P \rceil$. In step S4, the variable T[1] is set to $\lceil T[0]+T[1] \rceil$, and the value of the variable T[1] after processing is $\lceil 6 \times P \rceil$. In step S5, the variable T[0] is set to T[1], and the value of the variable T[0] after processing is $\lceil 6 \times P \rceil$. In step s6, the variable T[1] is set to T[2], and the value of the variable T[1] after processing is $\lceil 6 \times P \rceil$.

When i=1, d[i]=d[1]=0. In step S3, the variable T[2] is set to $\lceil 2*t[0] \rfloor$, and the value of the variable T[2] after processing is $\lceil 10 \times P \rceil$. In step S4, the variable T[1] is set to $\lceil T[0]+T[1] \rceil$, and the value of the variable t[1] after processing is $\lceil 11 \times P \rceil$. In step S5, the variable T[0] is set to T[2], and the value of the variable T[0] after processing is $\lceil 10 \times P \rceil$. In step S6, the variable T[1] is set to T[1], and the value of the variable T[1] after processing is $\lceil 11 \times P \rceil$.

When i=0, d[i]=d[0]=0. In step S3, the variable T[2] is set to $\lceil 2*T[1] \rfloor$, and the value of the variable T[2] after processing is $\lceil 22 \times P \rceil$. In step S4, the variable T[1] is set to $\lceil T[0]+T[1] \rceil$, and the value of the variable T[1] after processing is $\lceil 21 \times P \rceil$. In step s5, the variable T[0] is set to T[1], and the value of the variable T[0] after processing is $\lceil 21 \times P \rceil$. In step S6, the variable T[1] is set to T[2], and the value of the variable T[1] after processing is $\lceil 22 \times P \rceil$.

After the above processes, the processes in steps S2 through S7 are terminated, and the value $\lceil 21 \times P \rceil$ of the variable T[0] is output in the last step, S8.

Also, in addition to the above binary methods (Algorithms 1 and 2) and the Montgomery method (Algorithm 3), a method called the window method can be employed for realizing the scalar multiplication $\lceil d \times P \rceil$. In the window method, using a width of, for example, 4-bit, scalar multiplication by integers 0 through 15 are computed as an initial process, the results are held in a table, and in a scalar multiplication by d, the scalar d is divided for every 4 bits (windows); thereby, the scalar multiplication is computed. Hereinafter, an example of an algorithm for the window method (4-bit width) is described as Algorithm 4.

---
(4) Algorithm 4 [Window method (4-bit width)]
---

```
S01: W[0] ← O, W[1] ← P
S02: for i = 2 upto 15 {
S03:              W[i] = ⌈W[i−1] + P⌋
S04: }
S05: T[0] ← W[d[n−1,n−4]]
S06: for i = n−5 downto 3 step −4 {
S07:              T[0] ← ⌈16*T[0]⌋
S08:              T[0] ← ⌈T[0] + W[d[i,i−3]]⌋
S09: }
S10: return T[0] ,
``` where it is assumed that d is a scalar value in n bits, and n is a multiple of 4. Also, it is assumed that d[i, i−3] is a value in 4-bits starting from the lower i-th bit to the (i−3)th bit of d. W[i] is a table used in the window method.

As an example, a case is described herein which the scalar multiplication for d=21=$2^4+2^2+2^0$=$(10101)_2$=$(0001\ 0101)_2$ (d is an integer in 5 bits) is computed. Because the bit length of d (i.e., 5) is not a multiple of 4, zeros are padded into the higher three bits and it is handled as 8 bits for convenience, which results in n=8. First, W[0]=0 and W[1]=P are set as the initial values in step S01. Next, steps S02 through S04 are executed for i=2, 3, . . . , 15. For each i, W[i]=$\lceil W[i−1]+P \rfloor$ is set in step S03. Then, the value to which W[i] is set is $\lceil i \times P \rceil$. After the processes of steps S02 through S04, the variable T[0] is set to W[d[n−1, n−4]]=W[d[7, 4]]=W[0001]=$\lceil 1 \times P \rceil$ in step S05.

Next, processes in steps S06 through S09 corresponding to i=3 are executed. In step S07, the process of T[0]←$\lceil 16*T[0] \rfloor$ is executed, and $\lceil 16 \times P \rceil$ is registered as the variable T[0]. In step S08, the process of T[0]←$\lceil T[0]+W[d[i, i−3]] \rceil$=$\lceil T[0]+W[0101] \rceil$=$\lceil \lceil 16 \times P \rceil + \lceil 5 \times P \rceil \rceil$=$\lceil 21 \times P \rceil$, and $\lceil 21 \times P \rceil$ is registered as the variable T[0].

After the above processes, the processes in steps S06 through S09 are terminated. The value of $\lceil 21 \times P \rceil$ is output in the last step S10. In the window method, as described above, the scalar multiplication $\lceil d \times P \rceil$ is computed by using a table that is prepared in advance.

In a case in which the scalar multiplication is computed by using Algorithms 1 and 2 above, it depends on the bit value d[i] of d whether or not the processes in the steps with the marks of "*" are executed. In the simple power analysis (SPA), the secret key d is estimated by using this feature. From many experiments, it is detected that the waveform of power consumption that results from the addition of points on an elliptic curve (elliptic addition) and the waveform that results from doubling (elliptic doubling) can easily be distinguished from each other. Accordingly, it is possible to obtain the secret key d because the order and the number of elliptic additions and elliptic doublings can be obtained by measuring the waveforms formed in the computations in Algorithms 1 and 2 in processors. Additionally, Algorithms 3 and 4 do not include a branch condition that depends on the bit value d[i], and thus they have resistance to the SPA.

As a countermeasure against the SPA targeting Algorithms 1 and 2, a method called add-and-double-always method has been reported. In this method, an addition and a doubling are always computed for each bit in the algorithms. This method is reported by J. Coron, in "Resistance against Differential Power Analysis", Cryptographic Hardware and Embedded Systems 1999 (CHES 1999), Lecture Notes in Computer Science Vol. 1717, pp. 292-302, Springer-Verlag, 1999 (document [Coron99]). Because the elliptic addition and elliptic doubling are always performed alternately in this method, this method is thought to have resistance to the SPA. Algorithm examples in which add-and-double-always method is performed on the above Algorithms 1 and 2 are given below as (5) Algorithm 1' and (6) Algorithm 2'.

---
(5) Algorithm 1' [Binary method (LSB, add-and-double-always)]
---

```
S1: T[0] ← 0, T[2] ← P
S2: for i = 0 upto n−1 {
S3:        T[1] ← ⌈T[0] + T[2]⌋
S4:        T[2] ← ⌈2*T[2]⌋
S5:        T[0] ← T[d[i]]
S6: }
S7: return T[0] ,
``` where T[0], T[1], and T[2] represent temporary variables, d represents a scalar value in n bits, and d[i] represents a value of the lower i-th bit.

| (6) Algorithm 2' [Binary method (MSB, add-and-double-always)] |
| --- |
| S1: T[0] ← 0, T[2] ← P <br> S2: for i = n−1 downto 0 { <br> S3:   T[0] ← [2*T[0]] <br> S4:   T[1] ← [T[0] + T[2]] <br> S5:   T[0] ← T[d[i]] <br> S6: } <br> S7: return T[0] , | where T[0], T[1], and T[2] represent temporary variables, d represents a scalar value in n bits, and d[i] represents a value of the lower i-th bit.

By using Algorithms 1', 2', 3, and 4 above, it is possible to prevent the SPA. However, the document [Coron99] describes the DPA targeting these algorithms, and points out that a secret key is analyzed by the DPA even when these algorithms are used. Also, the analysis methods using the RPA and the ZVA are reported.

Neither the binary methods nor the Montgomery method have resistance to SPA, DPA, RPA, or ZVA. The exponent splitting (ES) method, a countermeasure against these power analysis methods, is reported by C. Clavier, M. Joye, in "Universal Exponentiation Algorithm—A First Step towards Provable SPA-resistance—", Cryptographic Hardware and Embedded Systems 2001 (CHES 2001), Lecture Notes in Computer Science Vol. 2162, pp. 300-308, Springer-Verlag, 2001 (document [Clavier-Joye01]). This ES method is a method in which scalar values are converted at random, the scalar d is divided into d=r+(d−r) by the random number r, and two scalar multiplications [r×P] and [(d−r)×P] are computed independently; thereafter, a scalar multiplication [d×P] is computed by adding the results of the two scalar multiplications to each other, which is based on a below equation.

$$[[r \times P] + [(d-r) \times P]] = [d \times P]$$

In the ES countermeasure, an algorithm having resistance to other types of SPA/DPA is used for the above two scalar multiplications [r×P] and [(d−r)×P].

| (7) Algorithm 5 [Exponent Splitting method] |
| --- |
| S1: r ← random( ) <br> S2: T[1] ← scalar(r, P) <br> S3: T[2] ← scalar(d-r, P) <br> S4: T[0] ← [T[1] + T[2]] <br> S5: return T[0] , | where random( ) represents a function for generating random numbers. Also, scalar (d, P) represents a function for computing the scalar multiplication [d×P], and is computed by using the above Algorithms 1', 2', 3, 4, and the like. Also, the variables r, T[0], T[1], T[2] represent temporary variables.

It is likely to say that the ES method has resistance to all of the types of SPA, DPA, RPA, and ZVA; however, a problem with this method in relation to the computational efficiency is the large amount of overhead that is required.

Patent Document 1 discloses an operating method, in which the elliptic addition and elliptic doubling are defined as one operation, and operations having the same properties are performed in parallel; thereby, resistance to side channel attacks is attained and scalar multiplication can be performed at a high speed.

Patent Document 1:
Japanese Patent Application Publication No. 2004-53814

SUMMARY OF THE INVENTION

It is an object of the present invention to provide a cryptographic device that can enhance the security against SPA, DPA, RPA, and ZVA by increasing the difficulty of guessing secret information.

The first cryptographic device according to the present invention is a cryptographic device executing a cryptographic process by using a secret key, comprising:

a random value generation unit for generating a random integer value that is based on random numbers;

a cryptographic operation unit for performing a cryptographic operation while including the random integer value in values that have to be originally used in an operation when executing an algorithm; and a randomization nullification unit for nullifying from an obtained value the effect of including the random integer value in an operation after execution of the encryption operation.

The second cryptographic device according to the present invention is a cryptographic device executing elliptic-curve cryptosystem by using a secret key, comprising:

a randomization unit for setting as an initial point a point R on an elliptic curve generated on the basis of random numbers;

a unit for performing scalar multiplication by using the initial point, a scalar value d for elliptic-curve cryptosystem, and a point P on an elliptic curve;

a randomization nullification unit for executing Q-R' by using a point R' related to the point R and a point Q obtained by the multiplication; and a unit for outputting a result of the nullification.

The third cryptographic device according to the present invention is a cryptographic device executing RSA cryptosystem by using a secret key, comprising:

a randomization unit for setting as an initial value an integer r generated on the basis of random numbers;

a unit for performing a modular exponentiation operation by using the initial value, an exponent d that is necessary for RSA cryptosystems, and an integer p;

a randomization nullification unit for executing modular multiplication of q/r' by using a value r' related to r and an integer q obtained in the operation; and a unit for outputting a result of the nullification.

According to the present invention, operations are performed with random integer values (coordinate values on an elliptic curve or integer values on a finite field) taken into consideration, each of the integer values being newly generated each time a calculation based on an executed algorithm is performed. Accordingly, the difficulty of guessing secret information increases, and thus it is possible to enhance the security against power analysis attacks because the information that the attacker obtains differs randomly each time the information is obtained.

DESCRIPTION OF THE PREFERRED EMBODIMENTS

According to an embodiment of the present invention, a cryptographic device for performing elliptic-curve cryptosystem by using secret keys includes a randomization unit for setting as an initial point a point R on an elliptic curve generated on the basis of random numbers, an operation unit for computing scalar multiplication by using the initial point, a scalar value d for the elliptic-curve cryptosystem, a point P on the elliptic curve, and a randomization nullification unit for executing Q-R' by using a point R' related to the point R and the point Q obtained by the multiplication, and a unit for outputting the result.

When an embodiment of the present invention is applied to the RSA cryptosystem, a cryptographic device for processing the RSA cryptosystem by using a secret key comprises a randomization unit for setting as an initial value an integer r generated on the basis of random numbers, a unit for performing the modular exponentiation operation by using the initial value; an exponent d that is necessary for the RSA cryptosystem; an integer p, a randomization nullification unit for executing q/r' by using the value r' related to r from an integer q obtained in the operation, and a unit for outputting the result.

According to an embodiment of the present invention, a process method can be realized that requires a smaller amount of scalar multiplication processes in elliptic-curve cryptosystem and has resistance to SPA, DPA, RPA, and ZVA.

Also, it is possible to provide a process method having resistance to SPA, DPA, RPA, and ZVA by applying an embodiment of the present invention to the RSA cryptosystem.

(a) Descriptions of Fundamentals

An elliptic-curve cryptosystem device that is one embodiment of the present invention may be realized as, for example, an information processing device dedicated to elliptic-curve cryptosystem, a personal computer, an IC chip included in an IC card (smart card) or the like, a mobile phone, a mobile information terminal device (PDA (Personal Digital Assistant) or the like), or a DVD player or the like, and comprises a processor for performing operations.

In the description below, an explanation is given for the case in which an elliptic-curve cryptosystem operation method according to an embodiment of the present invention is applied to an elliptic curve on a finite field GF ($p^m$) with $p^m$ elements where p is a prime number and m is an integer equal to or greater than one. Additionally, hereinafter, unless otherwise noted, lowercase letters (such as "d") represent scalar values and capital letters (such as "P" and "T") represent points on elliptic curves. Also, "^" represents the exponentiation, and a series of numbers between "(" and ")$_2$" represents a number expressed as a binary number. Also, a number preceded by "S" (for example, "S1:") represents a step number in an exemplary program. Further, the four arithmetical operations on elliptic curves are respectively included between "⌈" and "⌋".

An elliptic curve E on GF ($p^m$) is a set obtained by adding the point ∞ that is called the infinite point (also referred to as zero point hereinafter) to the set of points (x, y) that satisfies the equation below:

$$E: y^2 + a1 \times x \times y + a3 \times y = x^3 + a2 \times x^2 + a4 \times x + a6$$

where a1, a2, a3, a4, a6, x, and y are respectively the elements in GF ($p^m$). The points on elliptic curves can be expressed in the form of coordinates such as (x, y), however the infinite point ∞ is the only point that cannot be expressed in the form of (x, y).

The inverse element "−P" of P is defined as below, on the assumption that P is a point on the elliptic curve on GF ($p^m$).

$$\text{if } P=\infty, \lceil -P \rfloor = \infty \tag{1}$$

$$\text{if } P \neq \infty, \lceil -P \rfloor = (x, -y-a1 \times x - a3) \text{ when } P=(x, y) \tag{2}$$

Also, the sum (P3) of P1 and P2, i.e., P3=⌈P1+P2⌋ is defined as below on the assumption that P1 and P2 are two points on the elliptic curve E on GF ($p^m$).

$$\text{if } P1=\infty, P3=P2 \tag{1}$$

$$\text{if } P2=\infty, P3=P1 \tag{2}$$

$$\text{if } P1=\lceil -P2 \rfloor, P3=\infty \tag{3}$$

$$\text{if } P1 \neq \lceil -P2 \rfloor, P1=(x1,y1), P2=(x2,y2), \text{ and } P3=(x3,y3), \tag{4}$$

$$x3 = \lambda^2 + a1 \times \lambda - a2 - x1 - x2$$

$$y3 = -(\lambda+a1) \times x3 - v - a3$$

where
when P1≠P2, $$\lambda = (y2-y1)/(x2-x1)$$

$$v = (y1 \times x2 - y2 \times x1)/(x2-x1)$$

when P1=P2, $$\lambda = (3 \times x1^2 + 2 \times a2 \times x + a4 - a1 \times y1)/(2 \times y1 + a1 \times x1 + a3)$$

$$v = (-x1^3 + a4 \times x1 + 2 \times a6 - a3 \times y1)/(2 \times y1 + a1 \times x1 + a3)$$

A computation of ⌈P1+P2⌋ performed when P1≠P2 is called elliptic addition, and a computation of ⌈P1+P2⌋=⌈2×P1⌋ performed when P1=P2 is called elliptic doubling. Elliptic addition and elliptic doubling are computed on the basis of combinations among the addition, subtraction, multiplication, squaring, and inversion in the GF ($p^m$).

When p is a prime number, the finite field GF (p) is referred to as a prime field. In particular, when p is a prime number equal to or greater than 5, the elliptic curve E on the prime field GF(p) is a set obtained by adding the point ∞ referred to as the infinite point to the set of points (x, y) that satisfy the equation below.

$$E: y^2 = x^3 + a \times x + b$$

The infinite point ∞ is also referred to as zero. Also, a, b, x, and y are respectively the elements of GF (p). The points on elliptic curves can be expressed in the form of coordinates such as (x, y); however, the infinite point ∞ is the only point that cannot be expressed in the form of (x, y).

The inverse element "−P" of P is defined as below, on the assumption that P is a point on the elliptic curve of GF (p).

$$\text{if } P=\infty, \lceil -P \rfloor = \infty \tag{1}$$

$$\text{if } P \neq \infty, \lceil -P \rfloor = (x, -y) \text{ when } P=(x,y) \tag{2}$$

Also, the sum (P3) of P1 and P2, i.e., P3=⌈P1+P2⌋ is defined as below on the assumption that P1 and P2 are two points on the elliptic curve E of GF (p).

$$\text{if } P1=\infty, P3=P2 \tag{1}$$

$$\text{if } P2=\infty, P3=P1 \tag{2}$$

$$\text{if } P1=\lceil -P2 \rfloor, P3=\infty \tag{3}$$

if $P1 \neq -P2, P1=(x1,y1), P2=(x2,y2)$, and $P3=(x3,y3)$, (4)

$x3 = \lambda^2 - x1 - x2$ $y3 = -\lambda \times x3 - v$ where
when $P1 \neq P2$, $\lambda = (y2-y1)/(x2-x1)$ $v = (y1 \times x2 - y2 \times x1)/(x2-x1)$ when $P1 = P2$, $\lambda = (3 \times x1^2 + a)/(2 \times y1)$ $v = (-x1^3 + a \times x1 + 2 \times b)/(2 \times y1)$ A computation of ⌈P1+P2⌉ performed when P1≠P2 is called elliptic addition, and a computation of ⌈P1+P2⌉=⌈2×P1⌉ performed when P1=P2 is called elliptic doubling. The elliptic addition and elliptic doubling are performed on the basis of combinations among the addition, subtraction, multiplication, squaring, and inversion in the finite field GF (p).

Figure 1:
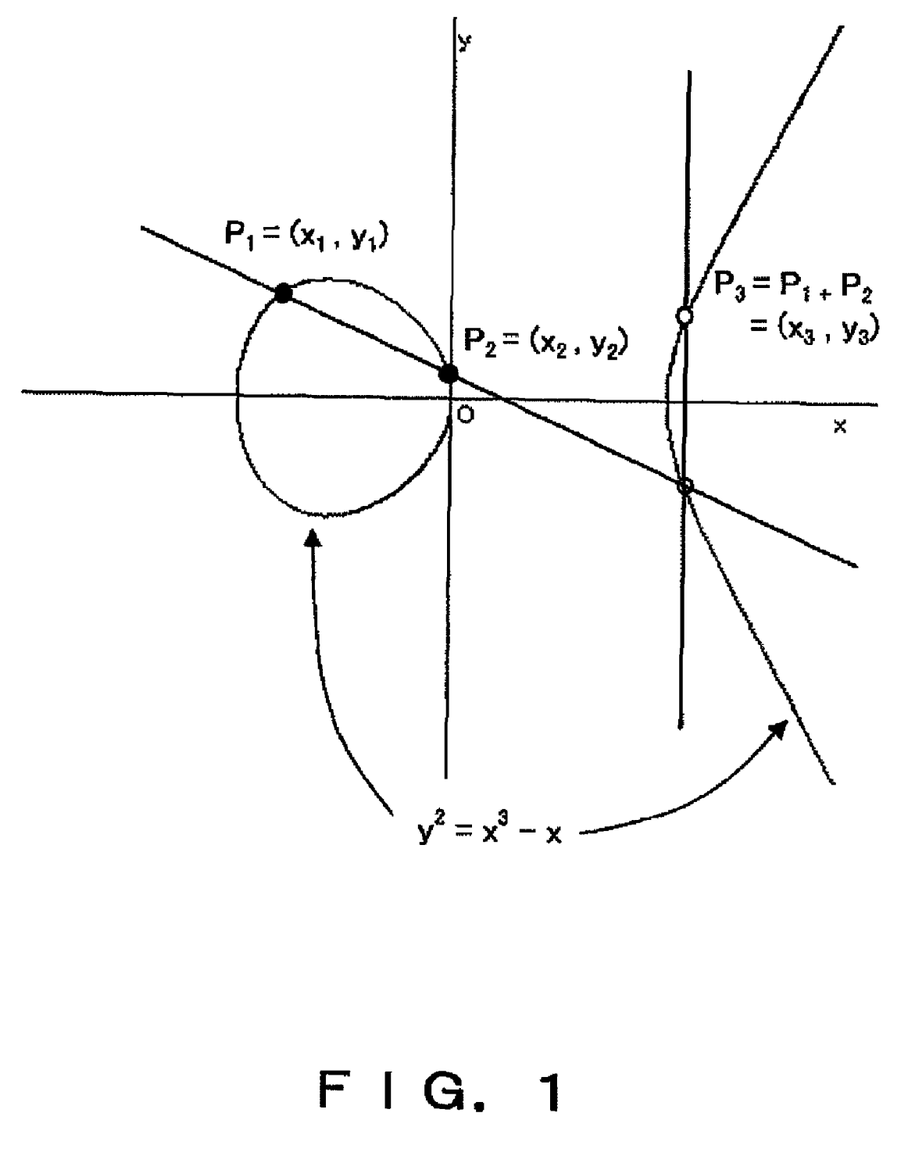
FIG. 1 shows the elliptic addition.
Figure 2:
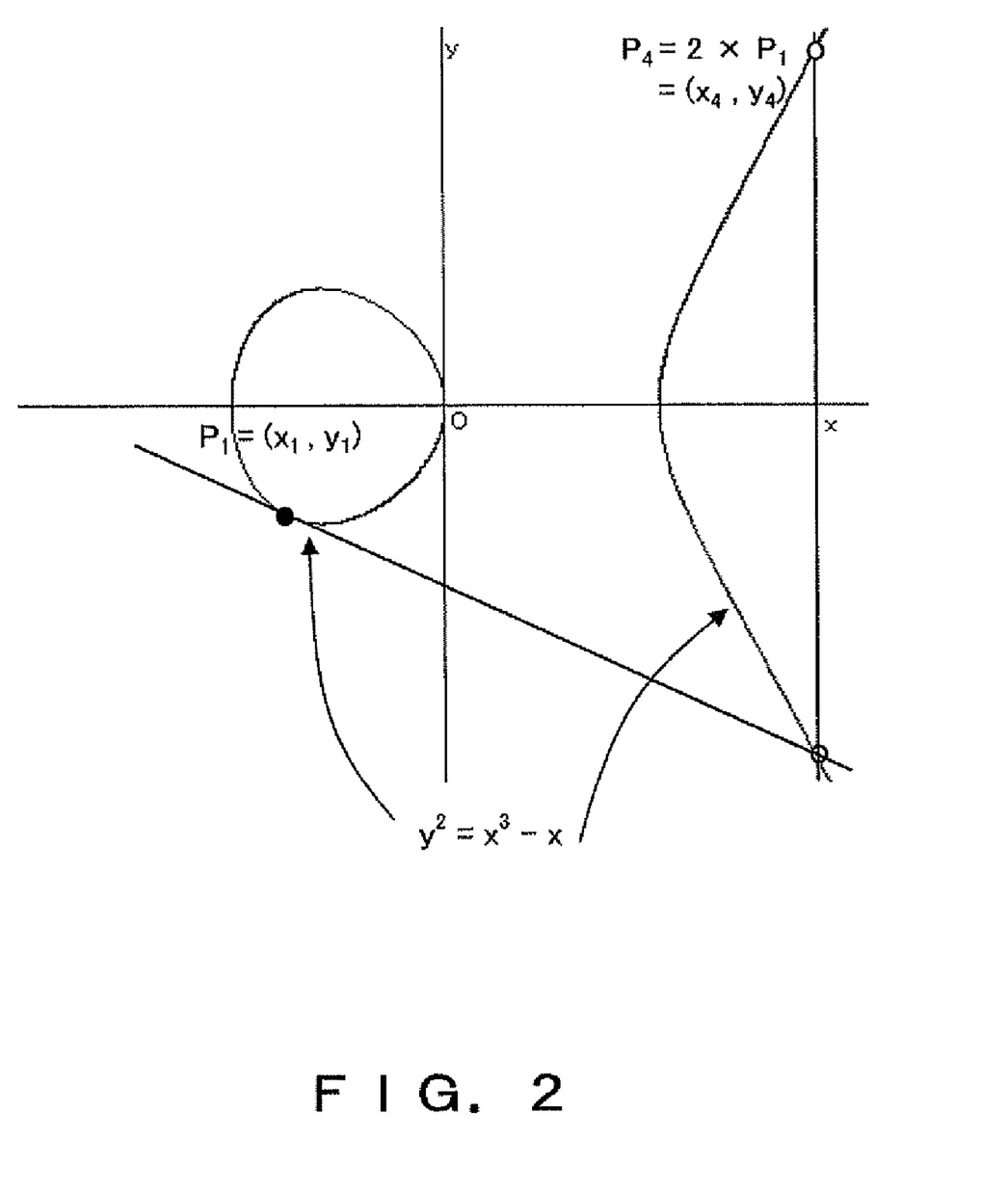
FIG. 2 shows the elliptic doubling.

FIG. 1 shows the elliptic addition. FIG. 2 shows the elliptic doubling.

The elliptic addition is, as shown in FIG. 1, defined as the point P3 (P3=⌈P1+P2⌉=(x3, y3)) that is the point that is symmetric, with respect to the X-axis, to the intersection between the elliptic curve and the straight line drawn through the points P1 and P2 (P1=(x1, y1) and P2=(x2, y2)). In FIG. 1, the curve expressed as the elliptic curve on the prime field by the equation $y^2=x^3-x$ is shown, and the curve is defined as below.

$x_3 = ((y_1-y_2)/(x_1-x_2))^2 - x_1 - x_2$, $y_3 = ((y_1-y_2)/(x_1-x_2))(x_1-x_3) - y_1$

The elliptic doubling is, as shown in FIG. 2, defined as the point P4 (P4=⌈P1+P1⌉=⌈2×P1⌉=(x4, y4)) that is the point that is symmetric, with respect to the X-axis, to the intersection between the elliptic curve and the tangent line to the point P1 (P1=(x1, y1)) on the elliptic curve. In FIG. 2, the curve expressed, as the elliptic curve on the prime field, by the equation $y^2=x^3-x$ is shown, and the curve is defined as below.

$x_4 = ((3x_1^2-1)/(2y_1))^2 - 2x_1$, $y_4 = ((3x_1^2-1)/(2y_1))(x_1-x_4) - y_1$

The computation of the point ⌈d×P⌉=⌈P+P+...+P⌉ (sum of d number of P) with respect to the elliptic curve E on the finite field, the point on the curve called the base point, and the integer d called the scalar is referred to as the scalar multiplication. The scalar multiplication is realized by combining the elliptic addition and the elliptic doubling.

In many cases, the computation time for the elliptic addition, elliptic doubling and the scalar multiplication are estimated on the basis of the sum of the computing times of the multiplication, squaring, and inversion. This is because the actual elliptic addition, elliptic doubling, and scalar multiplication are performed on the basis of combinations of addition, subtraction, multiplication, squaring, and inversion in the finite field, and in many cases the computation time for the addition and subtraction is negligibly shorter than the other computations.

Generally, the computation time for inversion in a finite field GF (p^m) is often much longer than that for multiplication or squaring. Therefore, the projective coordinates system is sometimes used to express points on an elliptic curve.

By employing the projective coordinates system, points on an elliptic curve on GF (p^m) are expressed in the form of (X:Y:Z). However, it is assumed that the point (X:Y:Z) and the (r×X:r×Y:r×Z) with respect to the element r on GF (p^m) (where r≠0) are identified to the same point to each other.

The equation of an elliptic curve in the projective coordinates system is expressed as below by substituting X/Z for x and Y/Z for y in the original equation.

$E: Y^2 \times Z = X^3 + a \times X \times Z^2 + b \times Z^3$

When the projective coordinates system is used, all the points on an elliptic curve can be expressed in the form of (X:Y:Z). The infinite point ∞=(0:1:0).

In "Efficient Elliptic Curve Exponentiation Using Mixed Coordinates", Asiacrypt 1998, Lecture Notes in Computer Science vol. 1514, pp. 51-65, Springer-Verlag, 1998 (document [CMO98]) by H. Cohen, A. Miyaji, and T. Ono, it is reported that the computation time required for elliptic addition in the projective coordinates system on the prime field is 12M+2 S, and the calculation time for elliptic doubling is 7+5 S, where 1M, 1 S respectively express the computation time required for one multiplication, one squaring in the prime field.

One type of projective coordinates system is the Jacobian coordinate system. In the Jacobian coordinates, points on an elliptic curve of GF (p^m) are expressed in the form of (X:Y:Z). However, it is assumed that a point (X:Y:Z) and a point (r²×X:r³×Y:r×Z) with respect to the element r on GF (p^m) (where r≠0) are identified to the same point to each other. The equation of an elliptic curve in the Jacobian coordinates system is expressed as below by substituting $X/Z^2$ for x, and $Y/Z^3$ for y in the original equation.

$E: Y^2 \times Z = X^3 + a \times X \times Z^4 + b \times Z^6$

When using the Jacobian coordinate system, all the points on an elliptic curve can be expressed in the form of (X:Y:Z). The infinite point ∞=(0:1:0).

In the document [CMO98], it is reported that the computation time required for the elliptic addition in the Jacobian coordinates system on the prime field is 12M+4 S, and the computation time required for the elliptic doubling is 4M+6 S, where 1M, 1 S respectively express the computation time required for one multiplication, one squaring in the prime field.

(b) Implementation Example of Embodiment

Hereinafter, a method of an elliptic-curve cryptosystem operation according to an embodiment of the present invention is explained for the case when the method is applied to an elliptic curve on the finite field GF (p) where the element number is p (where p is an integer equal to or greater than 5).

The elliptic curve E on GF (p) can be expressed in the equation below, $E: y^2 = x^3 + a \times x + b$ where a, b, x, and y are the elements of GF (p), and satisfy the condition below.

$4 \times a^3 + 27 \times b^2 \neq 0$

Figure 3:
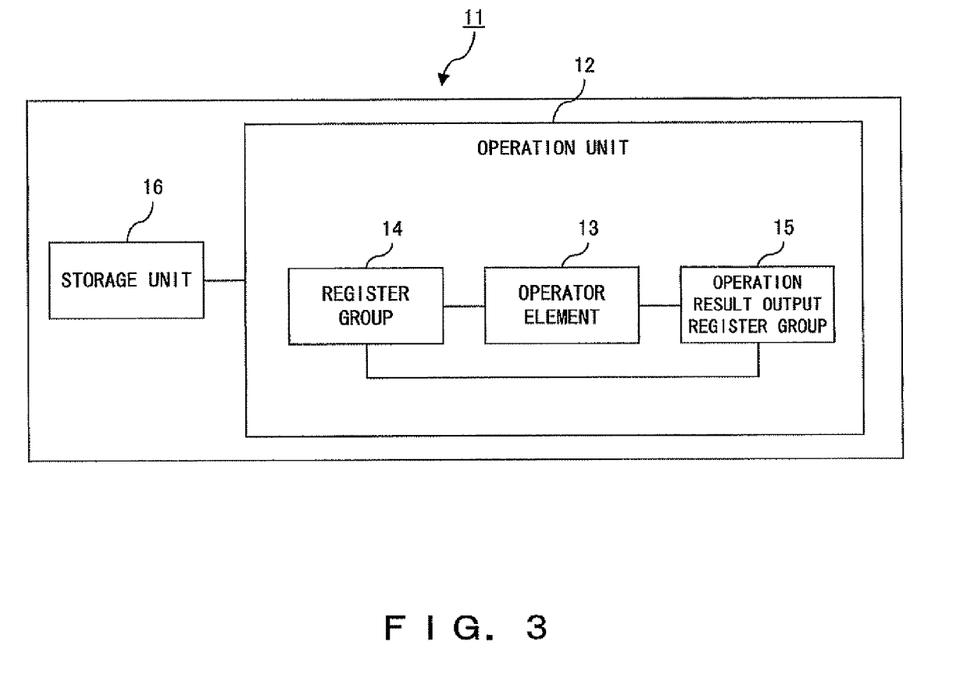
FIG. 3 shows a configuration of the main portion of an elliptic-curve cryptosystem device according to the present invention.

FIG. 3 shows a configuration of the main portion of an elliptic-curve cryptosystem device 11 according to the present invention.

The elliptic-curve cryptosystem device 11 comprises, as shown in FIG. 3, an operation unit (processor) 12 and a storage unit 16. The storage unit 16 stores operation programs for performing elliptic addition, elliptic doubling and the like (will be described later) for the elliptic-curve cryptosystem.

The operation unit 12 comprises an operator element 13, a register group 14, and an operation result output register group 15. The operator element 13 executes the elliptic curve cryptographic program stored in the storage unit 16 by using the register group 14, and outputs the operation result to the operation result output register group 15.

The register group 14 and the operation result output register group 15 respectively consist of a plurality of registers, and values used for operations, results of the operations, addresses on memory units of program codes currently executed, and the status of the CPU are stored in these registers. The calculation results obtained in particular by the operator element 13 are stored in the operation result output register group 15.

Figure 4:
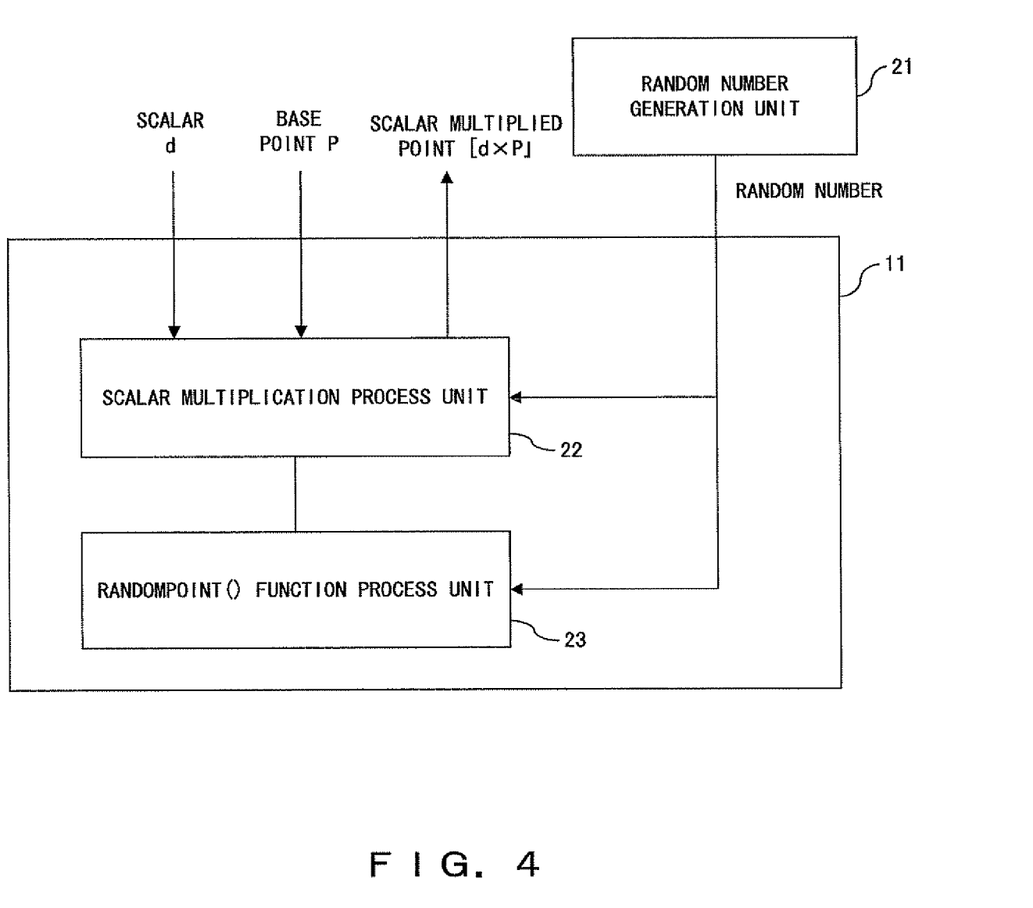
FIG. 4 is a block diagram showing a function configuration of an elliptic-curve cryptosystem device according to an embodiment of the present invention.

FIG. 4 is a block diagram showing a function configuration of the elliptic-curve cryptographic device 11 according to one embodiment of the present invention.

The elliptic-curve cryptosystem device 11 comprises, as shown in FIG. 4, a random number generation unit 21, a scalar multiplication process unit 22, and a randompoint( ) function process unit 23. The elliptic-curve cryptographic device 11 receives a base point P and a scalar d multiplied by the base point, and outputs the point $\lceil d \times P \rceil$ on an elliptic curve that has been scalar multiplied. The random number generation unit 21 generates random numbers to be used for randomizing values that are used by the scalar multiplication process unit 22 for the operations. The randompoint( ) function process unit 23 is a processing unit for generating coordinate values of random points on an elliptic curve on the basis of random numbers generated by the random number generation unit 21.

Implementation examples in which an embodiment of the present invention is applied to the elliptic-curve cryptosystem in the above Algorithms 1', 2' 3, and 4 are explained. Hereinafter, a method of an embodiment of the present invention is referred to as RIP.

First, an implementation example combined with the binary method (LSB) is shown (Algorithm 6).
(8) Algorithm 8 (RIP (LSB, 0))

```
S1: R ← randompoint( )
S2: T[0] ← R, T[2] ← P
S3: for i = 0 upto n−1 {
S4:         T[1] ← ⌊T[0] + T[2]⌋
S5:         T[2] ← ⌊2*T[2]⌋
S6:         T[0] ← T[d[i]]
S7: }
S8: return ⌈T[0] − R⌋,
``` where R, T[0], T[1], and T[2] represent temporary variables, d represents a scalar value in n bits, and d[i] represents a value of the lower i-th bit of d. Also, the function randompoint ( ) is a function that generates random points on an elliptic curve. In this example, the operations in the algorithm are the same as those in the above binary method (LSB); however, a random value is given as the value to be used in operation. This random value is generated by the function randompoint( ) for each operation; accordingly, even when operations are performed on the basis of an algorithm on a point on the same elliptic curve, the hamming weight whose power value is observed via a power analysis attack differs each time. Accordingly, it is possible to reduce the risk of important information being illegally accessed via a power analysis attack. Additionally, when the process in step S7 is terminated, the value of T[0] is $\lceil \lceil d \times P \rceil + R \rfloor$.

Next, the method of realizing the function randompoint( ) in Algorithm 6 is explained.
(Method 1: Generation of Value of X Coordinate at Random)

When generating the point R, the x coordinate is generated at random and it is checked whether or not there is a corresponding y coordinate value. Specifically, when the equation for an elliptic curve on a finite field whose characteristic is equal to or greater than 5 is used as below, $$y^2 = x^3 + a \times x + b$$

the value of r for the x coordinate is generated at random. Then, the value of r^3+a×r+b (the result of substituting r for x included on the right side of the equation) is obtained, and it is checked whether or not this value has square roots. When the value has the square root, the value of the square root is obtained as the y coordinate, and r and this square root are output. When the value does not have the square root, the process restarts from the step of obtaining the random value r.
(Method 2: Utilization of Table)

A set of random points that are candidates for R is held as a table, and R is selected and output at random from the table each time the function is called.
(Method 3: Random Number-Fold of Fixed Point)

A fixed point Q is held, a random value r is generated each time the function is called, scalar multiplication $\lceil r \times Q \rfloor$ is performed, and $\lceil r \times Q \rfloor$ is output as R.
(Method 4: Utilization of Fixed Point)

The projective coordinates expression for a fixed point Q is held as (X:Y:Z), a random value r is generated each time the function is called, and the result of (r×X:r×Y:r×Z) that is obtained by multiplying r by the respective coordinate values is output as R. The same effect can be attained by using the Jacobian coordinates system.
(Method 5)

A fixed point R is held, R is output in response to a call of the function, and an update is performed after the call such that R ← $\lceil 2 \times R \rfloor$.

Next, an implementation example that is combined with the binary method (MSB) is shown (Algorithm 7).

(9) Algorithm 7 (RIP (MSB, 0))

```
S1: R ← randompoint( )
S2: T[0] ← R, T[2] ← P
S3: for i = n−1 downto 0 {
S4:      T[0] ← ⌊2*T[0]⌋
S5:      T[1] ← ⌊T[0] + T[2]⌋
S6:      T[0] ← T[d[i]]
S7:      R ← ⌊2*R⌋
S8: }
S9: return ⌈T[0] − R⌋,
``` where R, T[0], T[1], and T[2] represent temporary variables, d represents a scalar value in n bits, and d[i] represents a value of the lower i-th bit of d. Also, the function randompoint ( ) is a function that generates random points on an elliptic curve, and this algorithm can be implemented in the same manner as it is in methods 1 through 5. In Algorithm 7, the method of operations of the algorithm are the same as in the above binary method (MSB); however, Algorithm 7 is different from the binary method in that the calculations of random points are included.

In this case, similarly to the above case, resistance to a power analysis attack is realized by including the random point R in the operation. When the process in step S8 is terminated, the value of T[0] is $\lceil d \times P + R \rfloor$.

Another implementation example combined with the binary method (MSB) is shown below (Algorithm 7').

| (10) Algorithm 7' (RIP (MSB, 0)') |
|---|
| S1: (R, R') ← randompoint( ) |
| S2: T[0] ← R, T[2] ← P |
| S3: for i = n−1 downto 0 { |
| S4:     T[0] ← ⌈2*T[0]⌋ |
| S5:     T[1] ← ⌈T[0] + T[2]⌋ |
| S6:     T[0] ← T[d[i]] |
| S7: } |
| S8: return ⌈T[0] − R'⌋ , | where R, R', T[0], T[1], and T[2] represent temporary variables, d represents a scalar value in n bits, and d[i] represents a value of the lower i-th bit of d. Also, the function randompoint( ) is a function that generates a random point and a point related to the random point on an elliptic curve. The method of implementation of the function will be described later. This algorithm operates in a similar manner to the way it does in the binary method (MSB); however, the manner of using the random point is different. The function randompoint( ) generates the value of R required for realizing the tamper resistance and the value of R' required for removing extra values that are elliptically added to the operation result in step S7. In the above algorithm, when the process in step S7 is terminated, the value of T[0] is $\lceil d \times P + 2^n \times R \rfloor$.

As a method of obtaining R', the following method can be employed.
(Methods 1' through 5')

In these methods, the point R is obtained by using the respective methods 1 through 5 for each call of the function, and the point $R' = \lceil 2^n \times R \rfloor$ is calculated by using this point R' in order to output the pair of points R and R'.
(Method 6')

In this method, a fixed point R and another fixed point $R'(R' = \lceil 2^n \times R \rfloor)$ are held, and the pair of points (R, R') is output in response to the call of the function. After the call, an update is performed in such a manner that $R \leftarrow \lceil 2 \times R \rfloor$ and $R' \leftarrow \lceil 2 \times R' \rfloor$.

Next, an implementation example combined with the Montgomery method is shown (Algorithm 8).

| (11) Algorithm 8 (RIP (Mon, 0+1)) |
|---|
| S1: (R,R') ← randompoint( ) |
| S2: T[0] ← ⌈P + R⌋, T[1] ← ⌈⌈2*P⌋ + R⌋ |
| S3: for i = n−2 downto 0 { |
| S4:     T[2] ← ⌈2*T[d[i]]⌋ |
| S5:     T[1] ← ⌈T[0] + T[1]⌋ |
| S6:     T[0] ← T[2−d[i]] |
| S7:     T[1] ← T[1+d[i]] |
| S8: } |
| S9: return ⌈T[0] − R'⌋ | where R, R', T[0], T[1], and T[2] represent temporary variables, d represents a scalar value in n bits, and d[i] represents a value of the lower i-th bit of d. Also, the function randompoint( ) is a function that generates a random point R and a point R' related to the random point on an elliptic curve. The following method can be employed as the method of implementation of the function. This algorithm operates in a similar manner to the way it operates in the above Montgomery method; however, random points are used. Similarly to Algorithm 7, the function randompoint (generates the value of R required for realizing the tamper resistance and the value of R' required for obtaining the right value after the operation. In the above algorithm, when the process in step S8 is terminated, the value of T[0] is $\lceil d \times P + 2^n \times R \rfloor$.

The following method can be employed as a method of generating R'.
(Methods 1" through 5")

In these methods, the point R is obtained by using the respective methods 1 through 5 for each call of the function, and the point $R' = \lceil 2^{(n-1)} \times R \rfloor$ is calculated by using this point R in order to output the pair of points R and R'.
(Method 6")

In this method, a fixed point R and another fixed point $R = \lceil 2^{(n-1)} \times R \rfloor$ are held, and the pair of points (R, R') is output in response to a call of the function. After the call, an update is performed in such a manner that $R \leftarrow \lceil 2 \times R \rfloor$ and $R' \leftarrow \lceil 2 \times R' \rfloor$.

Next, an implementation example combined with the Window method (four-bit width) is shown (Algorithm 9).

| (12) Algorithm 9 [RIP (W) (four-bit width)] |
|---|
| S1: R ← randompoint( ) |
| S2: W[0] ← 0, W[1] ← P |
| S3: for i = 2 upto 15 { |
| S4:     W[i] = ⌈W[i−1] + P⌋ |
| S5: } |
| S6: T[0] ← ⌈R + W[d[n−1,n−4]]⌋ |
| S7: for i = n−5 downto 3 step −4 { |
| S8:     T[0] ← ⌈16*T[0]⌋ |
| S9:     T[0] ← ⌈T[0] + W[d[i,i−3]]⌋ |
| S10: } |
| S11: return ⌈T[0] − R⌋ , | where it is assumed that d represents a scalar value in n bits and n represents a multiple of 4. It is also assumed that d[i, i−3] is a value in four bits starting from the lower i-th bit through the (i−3)th bit of d. W[i] represents a table used in the window method. The function randompoint( ) is a function that generates a random point on an elliptic curve. This algorithm can be implemented by using methods 1 through 5 above.

This algorithm operates in a similar manner to the way it operates in the above Window method; however, random points are used. In this case, when the process in step S10 is terminated, the value of T[0] is $\lceil \lceil d \times P \rfloor + R \rfloor$; accordingly, in step S11, R is deleted from T[0].

These explanations have been given for cases where p is a prime number equal to or greater than 5, and where the invention is applied to the Elliptic curve E on the finite field GF (p) where p is the element count in the above respective embodiments. However, the scope of the present invention is not limited to these explanations, and the present invention can be implemented while allowing various alterations without departing from the spirit of the present invention.

Further, these explanations have been given for cases where the present invention is applied to elliptic-curve cryptosystem in the above respective embodiments. However, the present invention can also be applied to RSA cryptosystem while allowing for various alterations without departing from the spirit of the present invention. Here, as one of the alterations, the elliptic-curve cryptosystem operation is replaced with an RSA cryptosystem operation (modular operation on the finite field) as described below.

elliptic addition ⌈P+Q⌉→modular multiplication p*q (mod n)
elliptic doubling ⌈2×P⌉→square modular p^2 (mod n)
scalar multiplication ⌈d×P⌉→modular exponentiation operation p^2 (mod n)
inverse element ⌈−P⌉→p that satisfies the relationship of p*q=1 (mod n) (this q is referred to as p^(−1))

Further, with the present invention being disclosed to the public, it is possible for those skilled in this field of art to implement or produce an elliptic-curve cryptosystem device, an elliptic-curve cryptosystem method, an elliptic-curve cryptosystem program, or a computer readable storage medium storing the elliptic-curve cryptosystem program according to the present invention.

Figure 5:
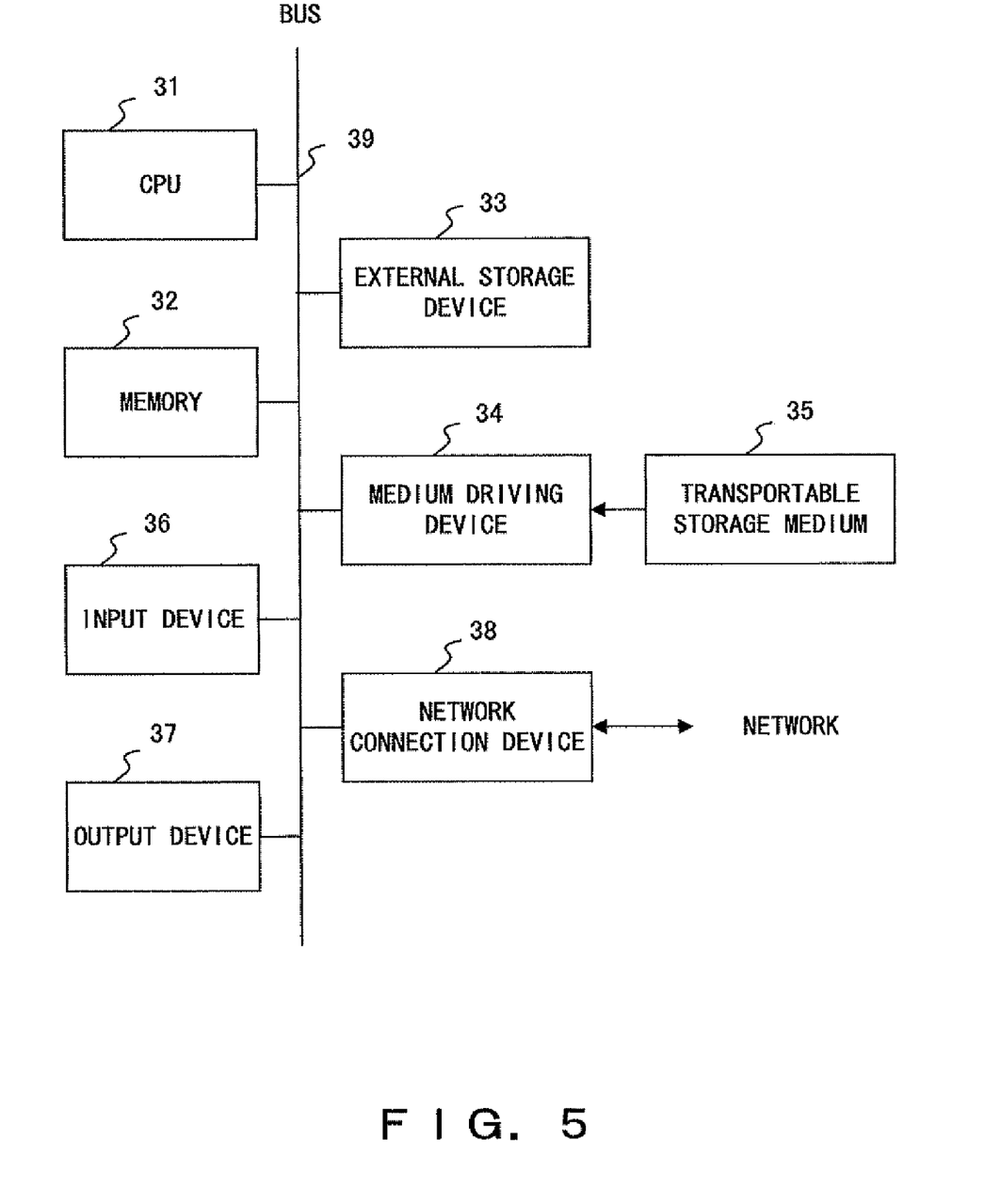
FIG. 5 shows a hardware environment of a cryptographic device according to an embodiment of the present invention.

FIG. 5 shows a hardware environment of a cryptographic device according to an embodiment of the present invention.

A program stored in an external storage device 33 for realizing embodiments of the present invention is copied onto memory 32 through a bus 39, and is executed by a CPU 31. Users' inputs are input through an input device 36. The input device 36 may be a keyboard, a mouse, a template or the like. Information is displayed to the users through an output device 37. The output device 37 may be a display device or the like. Additionally, this program can be stored in a transportable storage medium 35 such as a diskette, a CD-ROM, a DVD or the like, and can be executed by the CPU 31 after being copied into the memory 32 by using a medium driving device 34. Alternatively, it is also possible to read information in the transportable storage medium 35 by using the medium driving device 34 and to perform decryption processes on the information in order to verify users with the above described smart card used as the transportable storage medium 35. A network connection device 38 connects a cryptographic device to a network. It is also possible for the cryptographic device to receive, through the network, data to be encrypted or to be decrypted in order to process such data. Alternatively, it is also possible for the program to be downloaded to the external storage device 33 via the network and to be installed in the cryptographic device in order for the processes in the embodiments of the present invention to be realized.

In "Efficient Countermeasures against RPA, DPA and SPA", CHES 2004, Lecture Notes in Computer Science Vol. 3156, pp. 343-356, Springer-Verlag, 2004, written by H. Mamiya, A. Miyaji, H. Morimoto, (document [MMM04]), the calculation time for one bit is estimated to be 16M+10 S when the exponential division is performed as the scalar multiplication algorithm having resistance to the SPA, DPA, RPA, and ZVA, and an elliptic curve on the prime field is used where 1M and 1 S respectively express the calculation time required for one calculation of the multiplication and squaring on the prime field.

All of the above described embodiments are resistant to SPA, DPA, RPA, and ZVA. And, the calculation time for one bit is 13M+4 S when the implementation example of the Montgomery method is employed while using an elliptic curve on the prime field where 1M and 1 S respectively express the calculation time required for one calculation of the multiplication and squaring on the prime field. The ratio between 1M and 1 S varies in accordance with calculation environments. However, when the conversion value of 1 S=0.8 S assumed in the document [MMM04] is used, the calculation time required for conventional techniques is 24M, and the calculation time required for the present invention is 16.2 S. Accordingly, in the present invention, the calculation becomes faster by approximately 30%.

As described above, a cryptographic device according to the present invention is useful for processing RSA cryptosystem and elliptic-curve cryptosystem, and is effective against side channel attacks.

What is claimed is:

1. A cryptographic device executing elliptic-curve cryptosystem by using a secret key, comprising:
   a randomization unit that sets as an initial point a point R on an elliptic curve generated on the basis of random numbers;
   a setting unit that sets [2^n×R] which is a value obtained by scalar-multiplying the point R, to a point R' wherein n is an integer;
   a unit that performs scalar multiplication by using the initial point, a scalar value d for elliptic-curve cryptosystem, and a point P on an elliptic curve and performs multiplication by 2 on the point R';
   a randomization cancellation unit that executes Q−R' by using a point R' related to the point R, R' being obtained by multiplication by 2, and a point Q obtained by the multiplication; and
   a unit that outputs a result of the cancellation used for the secret key encrypting a plain text.

2. A cryptographic device executing RSA cryptosystem by using a secret key, comprising:
   a randomization unit that sets as an initial value an integer r generated on the basis of random numbers;
   a setting unit that sets r^(2^n) obtained by performing modular exponentiation operation on the point r, to the point r' wherein n is an integer;
   a unit that performs a modular exponentiation operation by using the initial value, an exponent d that is necessary for RSA cryptosystem, and an integer p and performs modular exponentiation operation raising to the second order on the value r';
   a randomization cancellation unit that executes modular multiplication of q*r'(−1) by using a value r' related to r, r' being obtained by modular exponentiation operation raising to the second order, and an integer q obtained in the operation; and
   a unit that outputs a result of the cancellation used for the secret key encrypting a plain text.

3. A cryptographic device executing an elliptic-curve cryptographic process by using a secret key, comprising:
   a random value generation unit that generates a random integer value based on random numbers indicating coordinates of a random point on an elliptic curve used for encryption;
   a setting unit that sets a value obtained by performing multiplication by 2^n on the elliptic curve on the random point wherein n is an integer;
   a cryptographic operation unit while performing scalar multiplication comprising a combination of multiplication by 2 and addition on the elliptic curve for a cryptographic operation, that sets coordinates of the random point as an initial value for operation and performs scalar multiplication while including coordinates of the random point in values that have to be used in an operation and that performs multiplication by 2 on a value obtained by performing multiplication by 2^n on the elliptic curve on coordinates of the random point; and
   a randomization cancellation that subtracts a value obtained by multiplying by 2 a value obtained by performing multiplication by 2^n on the elliptic curve on the coordinates of the random point from a value obtained by scalar multiplication on a value that has to be used in the operation after execution of the cryptographic operation, a subtracted result being used for the secret key encrypting a plain text.

4. A cryptographic method executing an elliptic-curve encryption process by using a secret key, comprising:
generating, using a processor, a random integer value based on random numbers indicating coordinates of a random point on an elliptic curve used for encryption;
setting, using the processor, a value obtained by performing multiplication by $2^n$ on the elliptic curve on the random point wherein n is an integer;
while performing scalar multiplication comprising a combination of multiplication by 2 and addition on the elliptic curve for a cryptographic operation, setting, using the processor, coordinates of the random point as an initial value for operation and performs scalar multiplication while including coordinates of the random point in values that have to be used in an operation and performing, using the processor, multiplication by 2 on a value obtained by performing multiplication by $2^n$ on the elliptic curve on coordinates of the random point; and
subtracting, using the processor, a value obtained by multiplying by 2 a value obtained by performing multiplication by $2^n$ on the elliptic curve on the coordinates of the random point from a value obtained by scalar multiplication on a value that has to be used in the operation after execution of the cryptographic operation, a subtracted result being used for the secret key encrypting a plain text.

5. A non-transitory storage medium that stores a program causing a computer to execute;
generating a random integer value based on random numbers indicating coordinates of a random point on an elliptic curve used for encryption;
setting a value obtained by performing multiplication by $2^n$ on the elliptic curve on the random point wherein n is an integer;
while performing scalar multiplication comprising a combination of multiplication by 2 and addition on the elliptic curve for a cryptographic operation, setting coordinates of the random point as an initial value for operation and performs scalar multiplication while including coordinates of the random point in values that have to be used in an operation and performing multiplication by 2 on a value obtained by performing multiplication by $2^n$ on the elliptic curve on coordinates of the random point; and
subtracting a value obtained by multiplying by 2 a value obtained by performing multiplication by $2^n$ on the elliptic curve on the coordinates of the random point from a value obtained by scalar multiplication on a value that has to be used in the operation after execution of the cryptographic operation, a subtracted result being used for the secret key encrypting a plain text.

6. A cryptographic method using elliptic-curve cryptosystem by using a secret key, comprising:
setting, using a processor, as an initial point a point R on an elliptic curve generated on the basis of random numbers;
setting, using the processor, $[2^n \times R]$ which is a value obtained by scalar-multiplying the point R, to a point R' wherein n is an integer;

performing, using the processor, scalar multiplication by using the initial point, a scalar value d for elliptic-curve cryptosystem, and a point P on an elliptic curve;
performing multiplication by 2 on the point R';
executing, using the processor, Q−R' by using a point R' related to the point R, R' being obtained by multiplication by 2, and a point Q obtained by the multiplication; and
outputting a result of the cancellation used for the secret key encrypting a plain text.

7. A non-transient storage medium storing a program causing a computer execute a cryptographic method using elliptic-curve cryptosystem by using a secret key, comprising:
setting as an initial point a point R on an elliptic curve generated on the basis of random numbers;
setting $[2^n \times R]$ which is a value obtained by scalar-multiplying the point R, to a point R' wherein n is an integer;
performing scalar multiplication by using the initial point, a scalar value d for elliptic-curve cryptosystem, and a point P on an elliptic curve;
performing multiplication by 2 on the point R';
executing Q−R' by using a point R' related to the point R, R' being obtained by multiplication by 2, and a point Q obtained by the multiplication; and
outputting a result of the cancellation used for the secret key encrypting a plain text.

8. A cryptographic method using RSA cryptosystem by using a secret key, comprising:
setting, using a processor, as an initial value an integer r generated on the basis of random numbers;
setting, using the processor, $r^{(2^n)}$ obtained by performing modular exponentiation operation on the point r, to the point r' wherein n is an integer;
performing, using the processor, a modular exponentiation operation by using the initial value, an exponent d that is necessary for RSA cryptosystem, and an integer p;
performing, using the processor, modular exponentiation operation raising to the second order on the value r';
executing, using the processor, modular multiplication of $q*r'(-1)$ by using a value r' related to r, r' being obtained by modular exponentiation operation raising to the second order, and an integer q obtained in the operation; and
outputting a result of the cancellation used for the secret key encrypting a plain text.

9. A non-transient storage medium storing a program causing a computer execute a cryptographic method using RSA cryptosystem by using a secret key, comprising:
setting as an initial value an integer r generated on the basis of random numbers;
setting $r^{(2^n)}$ obtained by performing modular exponentiation operation on the point r, to the point r' wherein n is an integer;
performing a modular exponentiation operation by using the initial value, an exponent d that is necessary for RSA cryptosystem, and an integer p;
performing modular exponentiation operation raising to the second order on the value r';
executing modular multiplication of $q*r'(-1)$ by using a value r' related to r, r' being obtained by modular exponentiation operation raising to the second order, and an integer q obtained in the operation; and
outputting a result of the cancellation used for the secret key encrypting a plain text.

* * * * *